United States Patent [19]

Howes et al.

[11] 4,403,303
[45] Sep. 6, 1983

[54] TERMINAL CONFIGURATION MANAGER

[75] Inventors: Ralph E. Howes, Sandy; John E. Benson, Salt Lake City; Ruben S. Longwell, Provo, all of Utah

[73] Assignee: Beehive International, Salt Lake City, Utah

[21] Appl. No.: 264,466

[22] Filed: May 15, 1981

[51] Int. Cl.³ .................... G06F 3/023; G06F 3/153; G06F 13/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,548,381 | 12/1970 | Dirks ................................. | 364/900 |
| 3,751,637 | 8/1973 | Dillon et al. .................... | 364/200 X |
| 3,760,375 | 9/1973 | Irwin et al. ......................... | 364/200 |
| 3,859,635 | 1/1975 | Watson et al. ..................... | 364/200 |
| 3,906,457 | 11/1975 | Mattedi et al. ...................... | 364/200 |
| 3,978,457 | 8/1976 | Check, Jr. et al. ................. | 364/200 |
| 4,007,443 | 2/1977 | Bromberg et al. .................. | 364/900 |
| 4,204,208 | 5/1980 | McCarthy ........................... | 364/900 |

Primary Examiner—Harvey E. Springborn
Attorney, Agent, or Firm—Thorpe, North & Western

[57] ABSTRACT

A terminal configuration management system manages the configuration of a microprocessor-based computer terminal which includes three types of memory elements: non-volatile read only memory, non-volatile read/write memory, and volatile random access memory, including configuration registers for storing short term configuration data that defines the configuration of the terminal. The read only memory has a block of standard configuration data, as well as configuration management processing routines stored therein which allow configuration parameters defined by the configuration data to be selectively displayed on the display screen of the terminal and to be readily modified and/or summarized through the use of specially labeled keys of a keyboard included in the terminal which correspond to the labeling used to identify the choices of configuration parameter values and groupings displayed on menu lists. Simplified table structures allow many such menu lists to be managed by few processing routines, using vocabulary strings which allow phrases and phrase fragments which are defined only once in the terminal's memory. Standard configuration data stored in the non-volatile read only memory is transferred to the configuration registers upon initial power up of the terminal. Modified short term configuration data may be transferred to the non-volatile read/write memory where it becomes long term configuration data. Such long term configuration data is transferred back to the configuration registers upon subsequent application of power to the terminal.

28 Claims, 17 Drawing Figures

CONTROL CONFIG BASE MENU(0)

F1 DISPLAY PARAMETER (1)
- F1 CURSOR FORM (1.1)
- F2 BELL (1.2)
- F3 TAB STOPS (1.3)
- F4 FIELD OVERFLOW (1.4)
- F5 PAGE OVERFLOW (1.5)
- F6 LINES PER PAGE (1.6)
- F7 FORMS DELIMITERS (1.7)
- F8 FORM TRANSMIT (1.8)
- F9 INTER-FIELD TAB TRANSMIT (1.9)
- F10 TRANSMIT FEATURE (1.10)
- F11 PARTIAL DISPLAY FEATURE (1.11)
- F12 HOLD IN RECEIVE (1.12)
- F13 LINE MONITOR (1.13)

F2 KEYBOARD PARAMETER (2)
- F1 KEYBOARD HOLD DOWN DELAY-REPEAT RATE (2.1)
- F2 KEYBOARD LOWERCASE (2.2)

F3 PRINTER PARAMETER (3)
- F1 KEYBOARD PRINTER (3.1)
- F2 KEYBOARD EXTENDED LINE FEATURE (3.2)
- F3 COMMUNICATIONS PRINTER (3.3)
- F4 COMM PRINTER POLLING ADDRESS (3.4)
- F5 COMM PRINTER SELECT ADDRESS (3.5)
- F6 SERIAL PRINTER PARAMETER (3.6)
  - F1 SERIAL PRINTER TYPE (3.6.1)
  - F2 SERIAL PRINTER BAUD RATE (3.6.2)
  - F3 SERIAL PRINTER PARITY (3.6.3)
- F7 PARALLEL PRINTER TYPE (3.7)
- F8 PRINTER SEGMENTS (3.8)

F4 EMULATION TYPE (4)
F5 RAM SIZE (5)
F6 LINE FREQUENCY (6)
F7 COMMUNICATIONS PARAMETER (7)
- F1 TRANSMIT BAUD RATE (7.1)
- F2 RECEIVE BAUD RATE (7.2)
- F3 PARITY (7.3)
- F4 PARITY CHECK (7.4)
- F5 STOP BITS (7.5)
- F6 MODEM TYPE (7.6)
- F7 TRANSMISSION NUMBER (7.7)
- F8 CLEAR TO SEND DELAY (7.8)
- F9 TRANSMIT TO RECEIVE DELAY (7.9)
- F10 REQUEST TO SEND DELAY (7.10)
- F11 ASYNC-SYNC (7.11)
- F12 POLLING ADDRESS (7.12)
- F13 GROUP POLLING ADDRESS (7.13)
- F14 GROUP SELECT ADDRESS (7.14)
- F15 COMMUNICATIONS PRINTER BUFFERS (7.15)
- F16 COMMUNICATIONS BLOCK SIZE (7.16)

F8 CONTROL CHARACTER ACTION (8)
- F1 COMM CR ACTION (8.1)
- F2 KEYBOARD CR ACTION (8.2)
- F3 DC1 ACTION (8.3)
- F4 DC2 ACTION (8.4)
- F5 COMM ETX STORE (8.5)
- F6 COMM ETX CURSOR ADVANCE (8.6)
- F7 FF ACTION (8.7)
- F8 COMM TAB ACTION (8.8)
- F9 KEYBOARD TAB ACTION (8.9)
- F10 LF ACTION (8.10)
- F11 SOH CLEAR DISPLAY (8.11)
- F12 SOH EXIT FORMS (8.12)
- F13 POLL/SELECT CHARACTER (8.13)

F9 TCM PASSWORD (9)

Fig. 10

MENU #1

```
SELECT DISPLAY PARAMETER
F1  -  CURSOR FORM
F2  -  BELL
F3  -  TAB STOPS
F4  -  FIELD OVERFLOW
F5  -  PAGE OVERFLOW
F6  -  LINES PER PAGE
F7  -  FORMS DELIMITERS
F8  -  FORM TRANSMIT
F9  -  TRANSMIT FEATURE
F10 -  INTER-FIELD TAB TRANSMIT
F11 -  PARTIAL DISPLAY FEATURE
F12 -  HOLD IN RECEIVE
F13 -  LINE MONITOR

USAGE OF KEYS FOR TERMINAL CONFIGURATION
F1-F16- SPECIFY A SELECTION FROM THE DISPLAYED LIST
ESC  - EXIT FROM THIS LIST
CR   - EXIT FROM THIS LIST AND ENTER NEXT LIST FOR THIS
       PARAMETER GROUP
CONFIG- TERMINATE CONFIGURATION SESSION
```

Fig. 11a

MENU #1.1

```
        SELECT CURSOR FORM

F1  -  NON-BLINKING BLOCK
F2  -  NON-BLINKING UNDERLINE
F3  -  BLINKING BLOCK
F4  -  BLINKING UNDERLINE
F5  -  DISABLED

USAGE OF KEYS FOR TERMINAL CONFIGURATION
F1-F16- SPECIFY A SELECTION FROM THE DISPLAYED LIST
ESC  - EXIT FROM THIS LIST
CR   - EXIT FROM THIS LIST AND ENTER NEXT LIST FOR THIS
       PARAMETER GROUP
CONFIG- TERMINATE CONFIGURATION SESSION
```

Fig. 11b

SUMMARY PAGE #1

```
         CURSOR FORM = NON-BLINKING BLOCK        BELL = 00  00
boooooooboooooobooooooboooooobooooooboooooobooooooboooooobooooo
         FIELD OVERFLOW = ENABLED        PAGE OVERFLOW = ENABLED
         LINES PER PAGE = 24             FORMS DELIMITERS = IF  IE
         FORM TRANSMIT = STANDARD        TRANSMIT FEATURE = STANDARD
         INTER-FIELD TAB TRANSMIT= DISABLED   PARTIAL DISPLAY FEATURE= DISABLED
         HOLD IN RECEIVE = DISABLED      LINE MONITOR = DISABLED
         KEYBOARD HOLD DOWN DELAY AND REPEAT RATE = DELAY .50 SEC. RATE 28CPS
         KEYBOARD LOWER CASE = ENABLED
         KEYBOARD PRINTER = PARALLEL     COMMUNICATIONS PRINTER = PARALLEL
         COMM PRINTER POLL ADDRESS= 04 04 COMM PRINTER SELECT ADDRESS = 04
         PARALLEL PRINTER TYPE = NONE    SERIAL PRINTER TYPE = NONE
         SERIAL PRINTER BAUD RATE = 50   SERIAL PRINTER PARITY = EVEN
         KBD EXTENDED LINE FEATURE = DISABLED PRINTER SEGMENTS = DISABLED EMULATION TYPE = BURROUGHS      RAM SIZE = 16K
         LINE FREQUENCY = 60 Hz
         F1 - EXIT CONFIGURATION SESSION
         F2 - DISPLAY NEXT CONFIGURATION PAGE
         F3 - ENTER CONFIGURATION SESSION AGAIN
         F4 - COPY SHORT TERM CONFIGURATION TO LONG TERM
         F5 - COPY LONG TERM CONFIGURATION TO SHORT TERM
         F6 - COPY STANDARD CONFIGURATION TO SHORT TERM
```

Fig. 12a

SUMMARY PAGE #2

```
         TRANSMIT BAUD RATE = 9600       RECEIVE BAUD RATE = 9600
         PARITY = EVEN                   PARITY CHECK = ENABLED
         STOP BITS = 1.00
         MODEM TYPE = STANDARD           TRANSMISSION NUMBER = DISABLED
         CLEAR TO SEND DELAY = 0 MSEC    TRANSMIT TO RECEIVE DELAY = 0 MSEC
         REQUEST TO SEND DELAY = 0 MSEC  ASYNC/SYNC = ASYNC

POLL ADDRESS = 04 04            GROUP POLL ADDRESS = 04 04
         GROUP SELECT ADDRESS = 20

COMMUNICATIONS BUFFERS (62 BYTES)= 64 COMMUNICATIONS BLOCK SIZE = UNLIMITED
         COMM CR ACTION = EXECUTE CR LF
         DC1 ACTION = STAY ON LINE       KBD CR ACTION = EXECUTE CR LF
         COMM ETX STORE = NON-STORE ETX  DC2 ACTION = FORM CONTROL
         FF ACTION = NON CLEAR TAB STOPS COMM ETX CURSOR ADVANCE = DISABLED
         KBD TAB ACTION = NON-STORE TAB  COMM TAB ACTION = NON-STORE TAB
         SOH CLEAR DISPLAY = DISABLED    LF ACTION = EXECUTE LF
         POLL/SELECT CHARACTER = 70/71   SOH EXIT FORM = DISABLED
         F1 - EXIT CONFIGURATION SESSION
         F2 - DISPLAY NEXT CONFIGURATION PAGE
         F3 - ENTER CONFIGURATION SESSION AGAIN
         F4 - COPY SHORT TERM CONFIGURATION TO LONG TERM
         F5 - COPY LONG TERM CONFIGURATION TO SHORT TERM
         F6 - COPY STANDARD CONFIGURATION TO SHORT TERM
```

Fig. 12b

| Address | Parameter | Valid Values | | Address | Parameter | Valid Values |
|---|---|---|---|---|---|---|
| 0080H | CE Options | 7 6 5 4 3 2 1 0<br><br>Parity Check<br>0 = Check<br>1 = Ignore<br><br>Response to DC1<br>0 = Disables<br>1 = Stay On Line<br><br>Forms Transmit<br>0 = Standard<br>1 = Transmit Page<br><br>Response To SOH<br>0 = Disabled<br>1 = Cursor to Home and Erase<br><br>SYNC/ASYNC Mode<br>0 = ASYNC<br>1 = SYNC | | 0084H | Lines Per Page | 0 - 24<br>1 - 30<br>2 - 45<br>3 - 60<br>4 - 75<br>5 - 90<br>6 - 105<br>7 - 120 |
| | | | | 0085H | Characters Per Line | Fixed at 80 |
| | | | | 0086H - 0087H | Forms Delimiters | 20H - 7FH |
| | | | | 0088H | Unassigned | |
| | | | | 0089H - 008AH | Polling Address | 20H - 7FH |
| | | | | 008BH | Group Select | 20H - 7FH |
| 0081H | Baud Rate | 7 6 5 4    3 2 1 0<br>Transmit  Receive<br>0 - 50       0 - 50<br>1 - 75       1 - 75<br>2 - 110     2 - 110<br>3 - 150     3 - 150<br>4 - 200     4 - 200<br>5 - 300     5 - 300<br>6 - 600     6 - 600<br>7 - 1200   7 - 1200<br>8 - 1800   8 - 1800<br>9 - 2000   9 - 2000<br>10 - 2400 10 - 2400<br>11 - 4800 11 - 4800<br>12 - 9600 12 - 9600<br>13 - 19200 13 - 19200<br>14 - External 14 - External | | 008CH | Unassigned | |
| | | | | 008DH | RTS Delay | 0 - 0msec<br>1 - 5msec<br>2 - 10msec<br>3 - 15msec<br>4 - 20msec<br>5 - 50msec<br>6 - 100msec<br>7 - 150msec<br>8 - 200msec<br>9 - 250msec<br>10 - 300msec |
| | | | | 008EH - 008FH | Group Polling Address | 20H - 7FH |
| | | | | 0090H - 0091H | | For operator use. Accessed with [ESC RM] sequence. |
| 0082H | CTS Delay | 0 - 0msec<br>1 - 5msec<br>2 - 10msec<br>3 - 15msec<br>4 - 20msec<br>5 - 50msec<br>6 - 100msec<br>7 - 150msec<br>8 - 200msec<br>9 - 250msec<br>10 - 300msec | | 0092H | Display Parameters | 7 6 5 4 3 2 1 0<br><br>IF ACTION<br>0 = LF<br>1 = CR LF<br><br>Cursor Blink<br>0 = Not Blink<br>1 = Blink<br><br>Character/Line<br>0 = 40<br>1 = 80 (Fixed at 80)<br><br>Lines/Display<br>0 = 12<br>1 = 24 (Fixed at 24)<br><br>Field Overflow<br>0 = Enable<br>1 = Disable<br><br>Cursor<br>0 = Displayed<br>1 = Not Displayed<br><br>KBD Lower Case<br>0 = Enable<br>1 = Disable |
| 0083H | Transmit To Receive Delay | 0 - 0msec<br>1 - 5msec<br>2 - 10msec<br>3 - 15msec<br>4 - 20msec<br>5 - 50msec<br>6 - 100msec<br>7 - 150msec<br>8 - 200msec<br>9 - 250msec<br>10 - 300msec | | | | |

Fig.13a

| Address | Parameter | Valid Values |
|---|---|---|
| 0093H | Lines Per Display | Fixed at 24 |
| 0094H 0095H | Unassigned | |
| 0096H | Display | 7 6 5 4 3 2 1 0<br>• bit 0: DC2 — 0=Form Control, 1=Cursor Advance<br>• bit 1: FF Action — 0=Home & Clear Screen, 1=Home, Clear Screen, Clear Variable Tab Stops<br>• bit 2: VT — 0=TD830, 1=TD700<br>• bit 3: CLEAR Key — 0=Clear Unprotected Data, 1=Clear Page (not used)<br>• bit 4: COMM ETX — 0=Don't Store ETX, 1=Store ETX in Memory<br>• bit 5: TAB — 0=Fixed, 1=Variable (constantly set to 1)<br>• bit 6: KBD Tab Action — 0=Non-store Tab, 1=Store Tab<br>• bit 7: Page Overflow (Wrap Around) — 0=Enable, 1=Disable |
| 0097H | End of Page Alarm Column | 0–80 (0 For Disable) |
| 0098H | End of Page Alarm Row | (0 For Disable) |
| 0099H | Flags | 7 6 5 4 3 2 1 0<br>• bit 0: KBD Printer — 0=Parallel, 1=Serial<br>• bit 1: COMM. PRINTER — 0=Parallel, 1=Serial<br>• bit 2: Line Frequency — 0=60Hz, 1=50Hz<br>• bit 3: Cursor Form — 0=Block, 1=Underline<br>• bit 4: Partial Display Mode — 0=Disable, 1=Enable<br>• bit 5: Insert Tab Between Field — 0=Disable, 1=Enable<br>• bit 6: Amount of RAM — 0=16K, 1=32K |
| 009AH | Unassigned | |
| 009BH | Flags | 7 6 5 4 3 2 1 0<br>• bit 0: Line Monitor — 0=Disabled, 1=Enabled<br>• bit 1: Hold in Receive Mode — 0=Disabled, 1=Enabled<br>• bit 2: Extended Print — 0=Disabled, 1=Enabled |
| 009CH–009DH | Unassigned | |
| 009EH | Printer Segments | 0-Disable, 1-1, 2-2, 3-3, 4-4, 5-5 |
| 009FH | Maximum Communication Block Size | 0=64  3=512  6=4096<br>1=128  4=1024  7=Unlimited<br>2=256  5=2048 |
| 00A0H | Flags | 7 6 5 4 3 2 1 0<br>• bit 0: COMM HT — 0=Don't Write Into Memory, 1=Write Into Memory<br>• bit 1: SOH Exit Forms — 0=Exit Forms, 1=Disable<br>• bit 2: COMM ETX — 0=Don't Advance Cursor, 1=Advance Cursor<br>• bit 3: COMM CR — 0=CR=CRLF, 1=CR=CR<br>• bit 4: COMM CR Into Memory — 0=Disable, 1=Enable<br>• bit 5: Keyboard CR — 0=CR=CRLF, 1=CR=CR<br>• bit 6: Keyboard CR Into Memory — 0=Disable, 1=Enable<br>• bit 7: Transmission — 0=Standard, 1=Line by Line |
| 00A1H–00AAH | Tab Stops | 80 Bit Bit-Map |

Fig. 13b

| Address | Parameter | Valid Values | Address | Parameter | Valid Values |
|---|---|---|---|---|---|
| 00ABH | Keyboard Repeat | 0 - Delay = .50sec rate = 50Hz<br>1 - Delay = .50sec rate = 28Hz<br>2 - Delay = .50sec rate = 20Hz<br>3 - Delay = .75sec rate = 20Hz<br>4 - Delay = .50sec rate = 18Hz<br>5 - Delay = .80sec rate = 18Hz<br>6 - Delay = .50sec rate = 14Hz<br>7 - Delay = .75sec rate = 14Hz<br>8 - Delay = 1.00sec rate = 14Hz<br>9 - Delay = .50sec rate = 10Hz<br>10 - Delay = 1.00sec rate = 10Hz<br>11 - Delay = 1.50sec rate = 10Hz<br>12 - Delay = .50sec rate = 6Hz<br>13 - Delay = 1.50sec rate = 6Hz<br>14 - Delay = 1.50sec rate = 6Hz<br>15 - Delay = 2.50sec rate = 6Hz | 0080H<br>0081H | Comm Printer Polling Address | 20F-7FH |
| | | | 0082H | Comm Printer Select Address | 20H-7FH |
| | | | 0083H | Main Parity | 0 - Even<br>1 - Space<br>2 - ODD<br>3 - Mark |
| 00ACH | Serial Printer Type | 0 - None<br>1 - Pin 11/19 = Ready<br>2 - Pin 11/19 = Busy<br>3 - Pin 11/19 = Reverse Channel<br>4 - ETX/ACK<br>5 - XON/XOFF<br>6 - ACK/NAK<br>7 - TTY | 0084H | Transmission Number(XMN) | 0 - Not Used<br>1 - 0 AND 1<br>2 - ⊕ AND A |
| | | | 0085H | Stop Bits | 0 - 1 Stop Bit<br>1 - 1.5 Stop Bits<br>2 - 2 Stop Bits |
| 00ADH | Serial Printer Baud Rate | 0 - 50<br>1 - 75<br>2 - 110<br>3 - 150<br>4 - 200<br>5 - 300<br>6 - 600<br>7 - 1200<br>8 - 1800<br>9 - 2000<br>10 - 2400<br>11 - 4800<br>12 - 9600<br>13 - 19200 | 0086H | Comm. Buffer Pool | 0 - 16 Buffers<br>1 - 32<br>2 - 48<br>3 - 64<br>4 - 80<br>5 - 96<br>6 - 112<br>7 - 128<br>8 - 256 |
| | | | 0087H | Emulation Type | 0 - Burroughs<br>1 - TTY |
| | | | 0088H | Self Test Constant | AA |
| 00AEH | Serial Printer Parity | 0 - Even<br>1 - Space<br>2 - Odd<br>3 - Mark | 0089H | Modem Type | 0 - Standard<br>1 - 212A-1<br>2 - 212A-2 |
| 00AFH | Parallel Printer Type | 0 - None<br>1 - Disable<br>2 - Dataproducts<br>3 - Centronics<br>4 - Tally | 00BAH-00BDH | Password | Valid ASCII Characters |
| | | | 00BEH-00BFH | EAROM CRC | |

Fig. 13c

TERMINAL CONFIGURATION MANAGER

BACKGROUND OF THE INVENTION

This invention relates to systems for managing the configuration of computer terminals, and more particularly to an improved apparatus and method for managing the configuration of a microprocessor-based smart or intelligent computer terminal or emulator.

A "computer" may be broadly defined as a machine for carrying out calculations, a machine for carrying out specified transformations on information, or a stored-program data-processing system. See "IEEE standard Dictionary of Electrical and Electronics Terms", 123 (2d ed. 1977). A "terminal" may likewise be broadly defined as a point in a system or communication network at which data can either enter or leave. See id. at 710. A "computer terminal" may thus be broadly considered as a point through which data may be entered or exited from a computer, i.e., a device for communicating with a computer system.

In recent years, there has been great strides made in the computer terminal industry. Whereas early computer terminals were almost exclusively mechanical teletype devices, modern computer terminals are sophisticated electronic devices that are generally microprocessor controlled, include a substantial amount of storage, provide a monitor (typically a cathode ray tube, or CRT) on which messages and data may be displayed, have a keyboard to facilitate easy manual entry of data and commands, and are adapted to be readily interfaced not only with the computer, but also with other data processing peripheral equipment, such as terminals, printers, expanded storage devices (disc and tape drives), and the like. Hereinafter, the term "terminal" will be used to refer to such modern microprocessor-based computer terminals.

The use of a microprocessor within the terminal greatly expands it capabilities over what was previously achievable in devices of the same physical size and cost. A microprocessor, of course, allows many data processing routines and functions to be stored and executed within the terminal itself rather than having the host system or computer define such routines and functions and completely control the operation of the terminal as was the case with prior art mechanical terminals, Thus, with such routines or functions present within the terminal, the terminal is able to "act on its own" and is not totally dependent upon the host computer for its intelligence. Such routines are typically stored within the terminal in a read only memory device, or ROM. The degree to which such processing routines or capabilities exist in a given terminal has given rise to classifying such terminals as: "dumb" (few processing capabilities present); "smart" (several processing functions present); and "intelligent" (many processing functions present).

Obviously, as more and more smart or intelligent terminals are utilized, the complexity of the host computer may be greatly simplified. Some intelligent terminals, in fact, have sufficient processing routines permanently stored therein that, when coupled to an expanded storage device, such as a tape, cassette, or disk drive system, from which the basic programs required to direct the desired computing functions (the software) may be loaded into the terminal's memory, the terminal may actually function as the host computer.

Each terminal has associated therewith a configuration. The terminal's configuration defines, for example, the type of display (blinking, high-lighted, line length, etc.) that appears on the terminal's CRT, the data rates associated with transmitting data from or receiving data to the terminal, whether such data is transmitted in parallel or serial fashion, the proper power line frequency, password parameters, control character actions, the logical operations that may be performed within the terminal, and the like. It will be appreciated that the particular configuration required to exist within a given terminal will be dictated by the environment and application in and for which the terminal is to be used.

As a practical matter, the terminal configuration is manifest through the terminal hardware. That is, if a certain baud rate is required for serial data transmission, the hardware of the terminal must be configured to provide that baud rate from a serial data port. Likewise, if a certain key on the keyboard is to be a repeat key (that is, if a continual depression of the key is to generate a repeated signal that will be interpreted the same as sequentially depressing the key over and over again), then the hardware associated with the keyboard must recognize a continual depression of the key (that is, a depression longer than a prescribed period of time) and must, in response to such recognition, generate the repeated signal at a desired rate. Hence, the bulk of the terminal configuration parameters must be designed into the terminal hardware. Accordingly, many prior art terminals must be ordered from the manufacturer to a specified configuration that is "built-in" to the terminal; or, as is more often the case, the configuration parameters associated with a given terminal come with the terminal and cannot be changed. That is, such parameters merely form part of the technical specifications of the terminal which must be carefully reviewed and analyzed by a potential buyer.

Because much of the hardware responsible for defining a particular terminal configuration is responsive to signals, or conditions within the terminal, such as binary 1's and 0's, which signals or conditions may generally be readily altered within the terminal if only their source or location is known, some prior art terminals have provided configurations that may be selectively altered or modified. Such altering or modifying has been realized, for example, by providing switches or hardware straps within the terminal that the terminal user may set to a desired position. However, detailed documentation is required in order to point the user to the correct location of the switch or strap. Further, access to such switches or straps generally requires the removal of the case of the terminal, thereby exposing the terminal boards and associated electronics, which exposure may cause damage to the terminal as well as pose a safety hazard to the unskilled user. Finally, the user who manipulates the switches or straps has no way of knowing if the desired configuration has been properly selected short of replacing the terminal cover, turning on power, using the terminal, and observing the configuration of the terminal that is manifest through such use.

It is also known in the art to use a block of memory within the terminal into which the desired 1's and 0's are stored that will define the desired configuration. The contents of this memory may then be displayed in a "bit map" (e.g., a matrix of 1's and 0's ) on the terminal's monitor or CRT. By knowing which bits control which configuration parameters, appropriate manual commands may be executed to alter the appropriate bits, thereby modifying the terminal's configuration to a desired state. However, detailed documentation is again required in order to know which bits of the cryptic bit map control which configuration parameters. Moreover, modifying such bit maps is very tedious and prone to error. Further, problems arise whenever such bit maps are used with respect to initialization of the bit map. That is, when power is first applied to the terminal, the bit map may come up in a random fashion, thereby causing the initial configuration assumed by the terminal to also be random. If this happens, appropriate configuraton data would have to be manually entered into the bit map each time the terminal is powered up. To prevent this, the power-up cycle may include copying into the bit map some known, bit-map data from a ROM or similar storage element. But if the bit map is subsequently altered, such alteration will be lost when power is removed from the terminal. Hence, the desired alteration to the bit map must be made each time power is subsequently applied to the terminal. This continual alteration is a nuisance where the terminal must continually power down and power up. Alternatively, the contents of the ROM could be altered to reflect the desired configuration, but such alteration is expensive, and even after it is performed, the same problem will exist if any subsequent modifications or alterations to the terminal's configuration are desired.

The use of hardware straps or switches, as well as the use of bit maps, to manage the terminal's configuration also prevents the terminal user from knowing the precise terminal configuration that has been selected without performing a detailed manual comparison between the accompanying detailed documentation and the setting of the switches, straps, or bits. Further, if the terminal user desires to alter the terminal configuration, the user does not know, without referring to such detailed documentation, just what terminal configuration options are available.

Many of the limitations associated with managing the configuration of prior art terminals have resulted from limited memory space within the terminal. While available memory space in any terminal can be increased by merely adding additional memory devices thereto, the addition of such additional memory for the sole purpose of facilitating the management of the terminal's configuration has not heretofore been cost justified. This is because the configuration of a given terminal is typically not managed nor altered that frequently. Hence, any terminal configuration management system that relies upon memory devices for storage of data or routines associated therewith must use such memory in an extremely efficient manner.

SUMMARY OF THE INVENTION

It is a first object of the present invention to provide a system whereby the configuration of a microprocessor-based computer terminal may be easily and accurately managed, modified, and/or verified.

It is a second object of the present invention to provide such a terminal configuration management system that does not require the use of hardware straps or switches.

It is a third object of the present invention to provide such a terminal configuration management system that efficiently uses available memory space in which to store the routines, tables, machine instructions, and the like associated therewith.

Is is a fourth object of the present invention to provide a terminal configuration management system that will, upon first applying power to the terminal, cause the terminal to assume a standard configuration without requiring an operator to manually enter configuration parameters or the like into the terminal's memory.

It is a fifth object of the present invention to provide such a terminal configuration management system that allows the initially assumed standard configuration of the terminal to be readily modified to other desired configurations through the selection of alternative configurations frc m self-contained, self-explanatory lists or menus of all possible configuration options, all without the need for referring to supplemental documentation.

It is a sixth object of the present invention to provide such a terminal configuration management system that permits the modified configuration to be saved in a non-volatile memory, from which memory it may be recalled upon subsequent applications of power to the terminal, thereby allowing the terminal to assume a previously modified configuration.

The above and other objects of the present invention are realized in an illustrative embodiment of a terminal configuration management system that is utilized in a microprocessor-based computer terminal having a monitor and a keyboard. Included as an extension of the keyboard is a special group of function keys, which in the preferred embodiment are sequentially labeled $f_1$, $f_2$, $f_3$, . . . $f_n$, where n is an integer representing the number of function keys employed.

Within the computer terminal there are employed three distinct types of memory storage elements. A first type is preferrably a read only memory (ROM) element in which the processing routines, table structures, vocabulary lists, and data associated with the operation of the terminal, including the terminal configuration management system, are stored. Data stored in a ROM device, as its name implies, is permanent, and is not affected by the removal of power. As such, the data may not be modified. A small block of this first type of memory, or ROM, is dedicated to storing data that defines a standard configuration for the terminal. The processing routines associated with the operation of the terminal configuration management system are also stored in ROM, but only a few such routines are required.

A second type of memory element employed within the terminal is a non-volatile memory, such as an electrically alterable read only memory (EAROM). Data held in such a memory will not be lost when power is removed. When power is applied, however, the data may be selectively modified or altered.

A third type of memory element used within the terminal is a volatile memory, preferrably a random access memory (RAM). Data stored in such a memory type is readily accessible and may be easily altered. However, such data is lost or destroyed whenever power is removed from the terminal.

A portion of the volatile memory, termed the configuration registers, is dedicated to holding a block of data that defines the configuration of the terminal. This configuration is realized by adapting the terminal hardware to respond to selected bits of the configuration data, each bit or combination of bits serving to control a particular configuration parameter, the combination of all such configuration parameters thereby defining the overall terminal configuration.

In operation, the terminal configuration management system of the present invention includes an automatic transfer of the standard configuration data stored in the ROM to the EAROM when power is first applied to the terminal, or when certain error conditions exist. Then, as part of the normal power-up cycle, whether such a cycle be an initial power-up or subsequent power-up, the configuration data held in the EAROM is transferred to the configuration registers of the volatile memory, or RAM. This transfer includes a thorough check or verification that such transfer was accurately performed. Thus, during the initial power-up cycle of the terminal, the standard configuration data held in ROM is transferred to the configuration registers of the RAM through the EAROM. In this fashion, a standard configuration for the terminal is initially assumed, and the terminal is prevented from assuming a random configuration.

The terminal configuration management system of the present invention further allows the configuration of the terminal to be easily altered. This alteration is achieved through the use of unique table structures, stored in ROM, that allow many configuration lists or menus to be displayed on the terminal CRT. These unique table structures are managed by relatively few processing routines, thereby reducing ROM space requirement. Further, the table structures themselves employ vocabulary strings that define phrases and phrase fragments only once even though such phrases or fragments may be used many times in many table structures. Thus, additional ROM space is saved.

An operator desiring to alter the terminal configuration merely calls up the main terminal configuration management processing routine via keyboard entry and enters the correct password. A first list or menu of configuration parameter groupings is then displayed on the terminal monitor, each item on the menu being labeled with a symbol corresponding to one of the function keys. The operator then selects which grouping is to be altered by pushing the appropriate function key. This selection is followed by the display of a second list or menu on the terminal monitor that details the particular parameter grouping that was selected, each item of the menu also being labeled with a symbol of a unique function key. This detailing may include sub-groupings of the configuration parameters, or it may include a listing of an actual parameter and the various states it may assume. If the former, then a selection of a desired sub-grouping causes a third list or menu to be displayed. If the latter, then a selection of a desired state of the parameter causes the appropriate data bits corresponding to that parameter in the configuration registers to be altered to reflect the selection that was made.

In the above fashion, by merely reviewing the options that are listed on the menu list displayed on the monitor, and by making selections by depressing the appropriate function keys corresponding to the desired choices, the entire configuration of the terminal may be easily managed.

The invention further includes an additional routine for displaying a summary of all the configuration parameters presently defined by the configuration data held in the configuration registers of the RAM. Should a user desire to save a particular configuration thus held in RAM, means are included in the invention for copying the data held in the configuration registers into the EAROM, where it will be saved despite a loss of power, and from where it will be transferred back into the configuration registers upon subsequent power-up cycles.

BRIEF DESCRIPTION OF THE DRAWINGS

The above objects, features, and advantages of the invention will be more apparent from the following more particular description of the invention presented in connection with the accompanying drawings, in which:

FIG. 10 depicts the menu tree associated with the preferred embodiment of the invention;

FIGS. 11a and 11b are exemplary menus associated with the menu tree of FIG. 10, and are depicted as they would be seen on the terminal monitor;

FIGS. 12a and 12b illustrate exemplary displays on the monitor screen of the terminal that summarize the status of the terminal configuration as managed by the present invention; and FIGS. 13a, 13b, and 13c detail the contents and locations of the configuration registers associated with the preferred embodiment of the invention.

DETAILED DESCRIPTION OF THE INVENTION

The invention disclosed herein is best understood by reference to the drawings wherein like numerals are used to designate like parts throughout.

Figure 1:
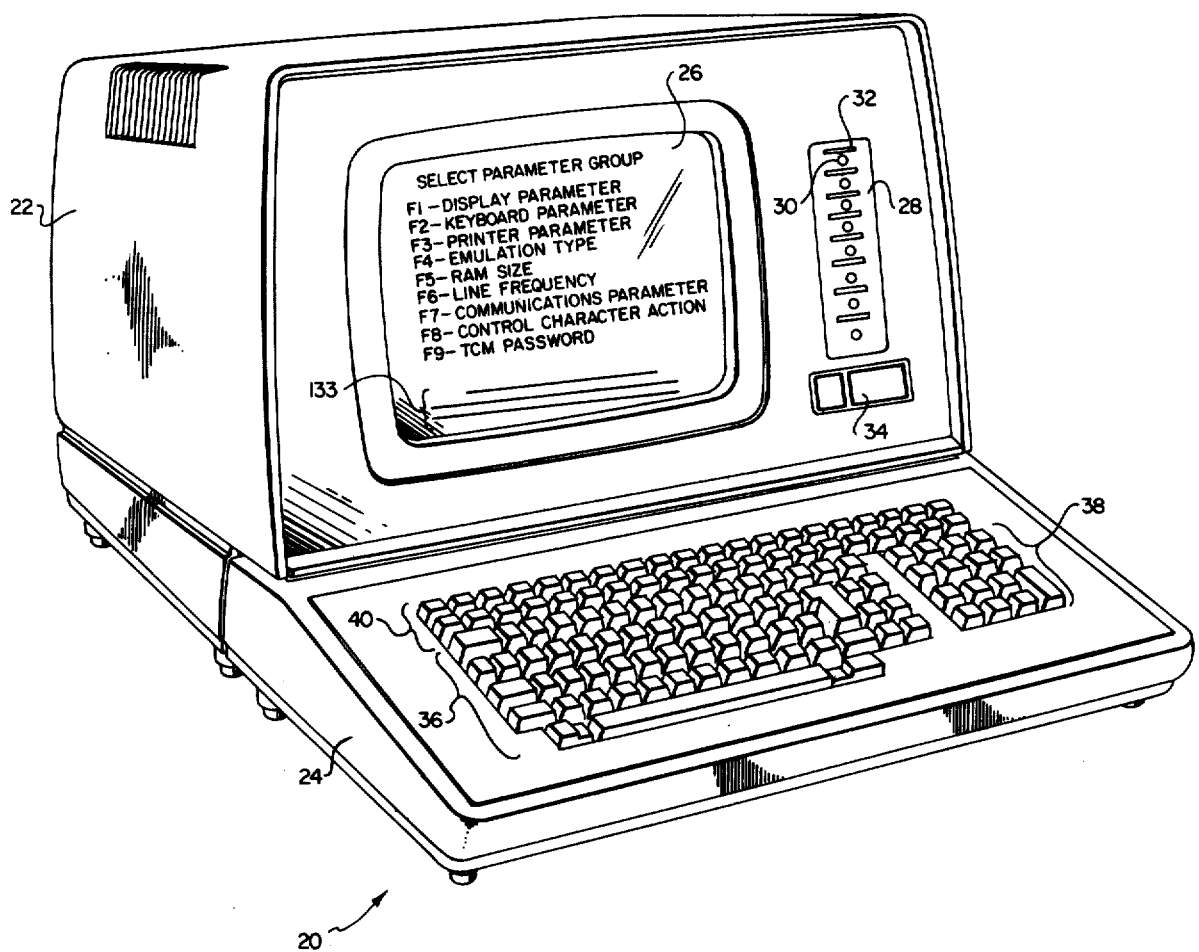
FIG. 1 is a perspective view of a computer terminal in which the terminal configuration management system of the present invention is employed, and on the monitor of which the base menu associated with the preferred embodiment of the invention is displayed.

In FIG. 1, a microprocessor-based terminal 20 is shown in perspective view. In the preferred embodiment, the terminal 20 includes a monitor unit 22 and a keyboard unit 24, interconnected by a ribbon cable (not shown). The keyboard unit 24 may be positioned up against the monitor 24, as shown in FIG. 1, so that the terminal 20 appears as a single unit; or the keyboard unit 24 may be positioned up to a few feet away from the monitor 22.

The monitor 22 includes a display screen 26, which is typically realized with a cathode ray tube (CRT), upon which information or data related to the operation of the terminal may be displayed. Typically, the monitor 22 will also include a display indicator 28 which consists of an array of lights (or similar indicators), such as 30, each light having a label, such as 32, associated therewith to indicate the particular mode of operation, or other status of the terminal. For example, in the preferred embodiment, lights 30 are provided to indicate: LOCAL; RECEIVE; TRANSMIT; POLL; ERROR; MESSAGE WAITING; BUSY; and POWER. A further label block 34 may serve to identify the manufacturer of the terminal, or to provide pertinent identifying information with respect to the terminal.

Inside of the housing of the monitor 22, of course, the electronic circuitry—hardware and firmware—required to operate the terminal is housed, as discussed more fully below.

Figure 2:
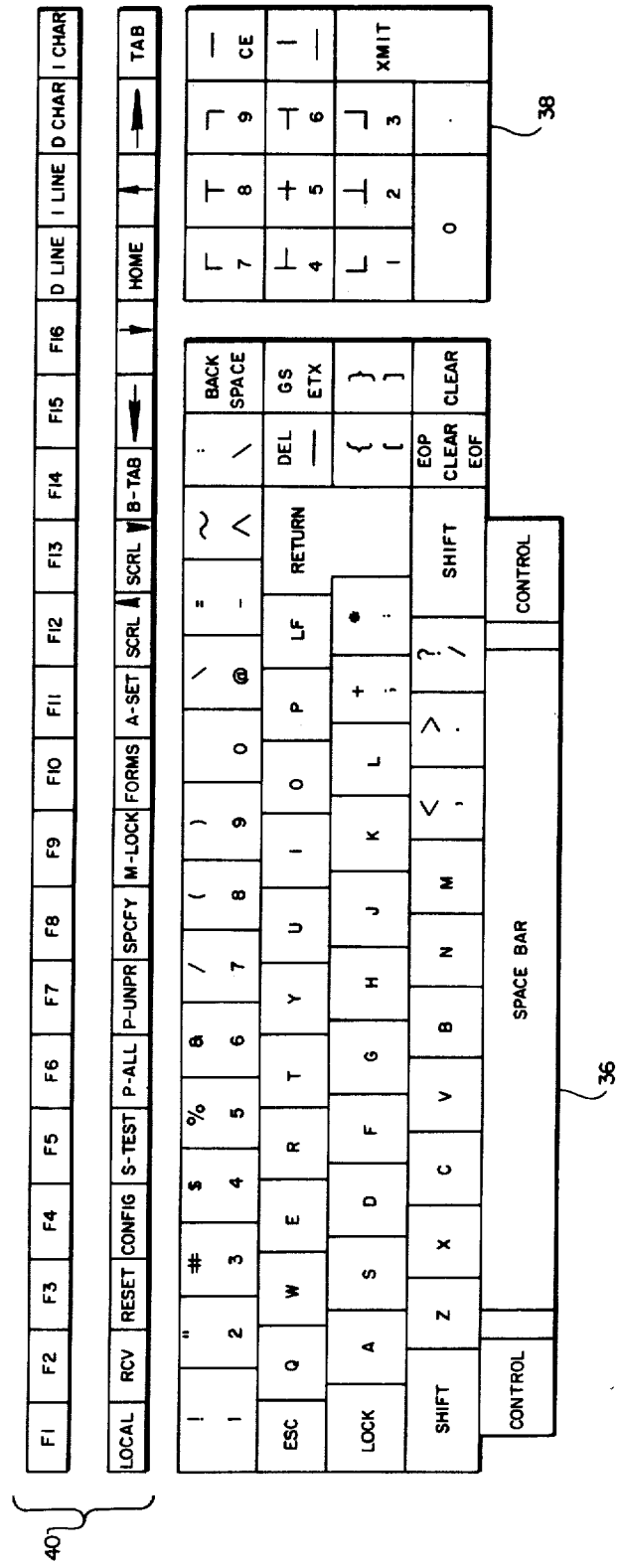
FIG. 2 is a top view of a possible keyboard arrangement of the terminal shown in FIG. 1.

The keyboard unit 24 includes a first group of keys 36 that are arranged in conventional typewriter format. A second group of keys 38 are arranged to include a conventional 10-key, or calculator, format, plus some additional control keys. The third group of keys 40 provide special control functions that aid in the operation of the terminal. The group of keys 40 plays an important role in the operation of the terminal configuration management system described herein. FIG. 2 further details an exemplary arrangement of the key groups 36, 38, and 40.

Figure 3:
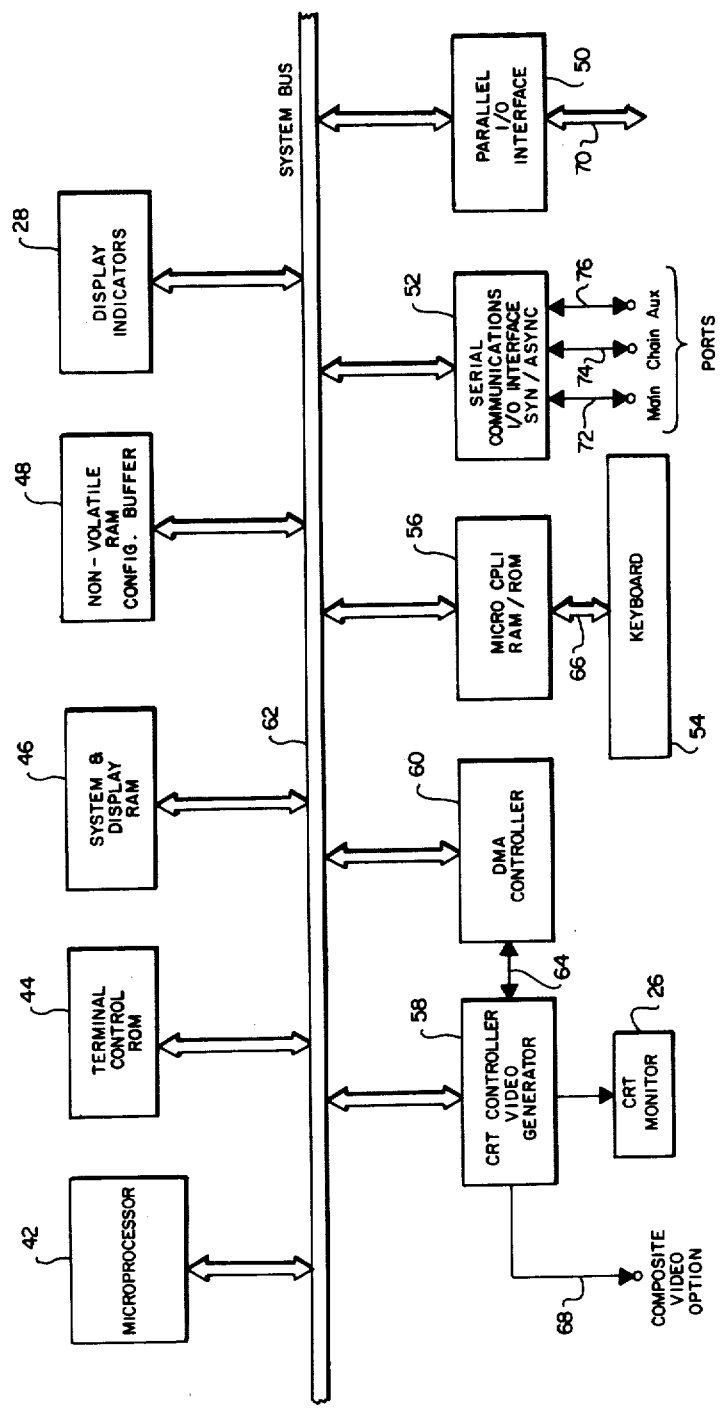
FIG. 3 is a simplified diagram of the terminal of FIG. 1.

Referring next to FIG. 3, there is shown a simplified block diagram of the terminal 20 of FIG. 1. The terminal includes a microprocessor 42, a block of read only memory (ROM) 44, a block of random access memory (RAM) 46, a block of non-volatile random access memory 48, display indicators 28, a parallel input/output (I/O) interface block 50, a serial communications I/O interface block 52, a keyboard 54 (which includes the three key groupings 36, 38, and 40 shown in FIGS. 1 and 2), a micro-control processing unit (CPU) 56 for interfacing with the keyboard 54 (which micro CPU includes its own dedicated RAM/ROM storage capacity), a CRT monitor 26, a CRT controller and video generator 58, and a direct memory access (DMA) controller 60.

Each of the above described blocks are interconnected by a system bus 62. Further, the DMA Controller 60 has a direct connection 64 with the CRT Controller 58. The keyboard 54 is also connected directly to the micro CPU 56 via bus 66. A composite video option is provided as an output 68 from the CRT controller 58. A parallel interface bus 70 provides access through the parallel I/O interface block 50 to the system bus 62. A main port 72, chain port 74, and auxilliary port 76 also provide serial access to the serial I/O interface 52.

To those skilled in microprocessor technology, the block diagram of FIG. 3 is self-explanatory. Nevertheless, without attempting to teach microprocessor technology in this application, which technology is not claimed as a novel element of this invention, the following simplified explanation of the operation of the terminal 20 based upon FIG. 3 is provided as an aid in understanding the more detailed disclosure of the invention which is to follows.

The microprocessor 42, for purposes of this disclosure, may be simply viewed as a sequencer, or, in other words, a device that sequences through a series of operational codes (op codes) that define certain functions the hardware of the terminal 20 is to perform. The op code itself may be thought of as nothing more than a series of logical 1's and 0's, or bits, each of which, or selected combinations of which, are adapted to generate appropriate control signals that steer the hardware so as to cause the desired function to be performed. (For convenience, the series of bits that comprise the op code, or any series of bits for that matter, may be referred to collectively as a "byte.") Each op code has associated therewith an address. The microprocessor 42, or sequencer, is designed to point to a starting address, act upon the op code located thereat, point to another address (typically the present address plus 1), act upon the op code located thereat, and so on, thereby sequencing through a series of op codes and causing the hardware to perform a desired function.

A series of op codes that cause the hardware to perform a desired function may be referred to as a processing routine. A simple processing routine, for example, may provide for displaying data entered via the keyboard 54 on the CRT monitor 26. Such a routine, when invoked by the microprocessor 42, would include at a starting address initially pointed to by the microprocessor, an op code that would instruct or cause the micro CPU 56 to place a byte of data on the system bus 62. This byte of data would correspond to the data entered by the keyboard 54, which byte would be held in a register (or other storage element) of the micro CPU 56. The next addressed op code in the routine, would cause the CRT controller 58 to receive the data byte appearing on the system bus 62 through the intervention of the DMA controller 60. In turn, the next addressed op code would cause the CRT controller 58 to generate the appropriate video signals that would cause the data to be displayed on the CRT monitor 26. Finally, the next addressed op code of the routine might return the pointer of the microprocessor back to a reference point to where the next routine to be accessed could be identified.

The microprocessor 42 has included therein a reference register or registers to which the starting address of the routine to be processed may be placed. This reference register acts as the pointer, that is, its contents point to the address of the particular op code that is to be executed. Means are provided within the microprocessor 42 for following a set sequence of routines. Means are also provided within the terminal for interrupting this set sequence to perform additional routines when the need arises. Such sequences of routines and interrupts are usually prioritized, or otherwise ordered, so that only one routine is performed or executed at a given time. For example, when the terminal 20 is first powered up, the starting address of a power-up processing routine is automatically inserted into the reference register. This routine causes a number of internal housekeeping functions to be executed that ready the terminal for receiving, transmitting, or displaying data. After this initializing routine is executed, the starting address of the next routine to be processed is placed in the reference register, and, this routine is also executed. This process continues until all the desired routines have been executed.

The op codes associated with the basic processing routines required for operation of the terminal 20 are permanently stored in the ROM 44. Additional processing routines may be stored in the RAM 46 as needed or desired. The op codes associated with such additional routines are typically received from an external source, such as from the host computer. Such additional routines are addressed by the pointer in the microprocessor 42 in the same fashion as are the routines permanently stored in the ROM 44. It is to be emphasized, however, that all of the routines associated with the operation of the invention disclosed herein are permanently stored in the ROM 44.

The above description is, of course, greatly simplified. There are numerous considerations known and understood by those skilled in microprocessor art, such as the timing and duration of the various signals associated with the processing of a routine, that have been omitted from the above simplified description. As simple as it is, however, it is hoped that the above description will prove helpful to those unskilled in the art in the discussion of the present invention that follows.

Figure 4:
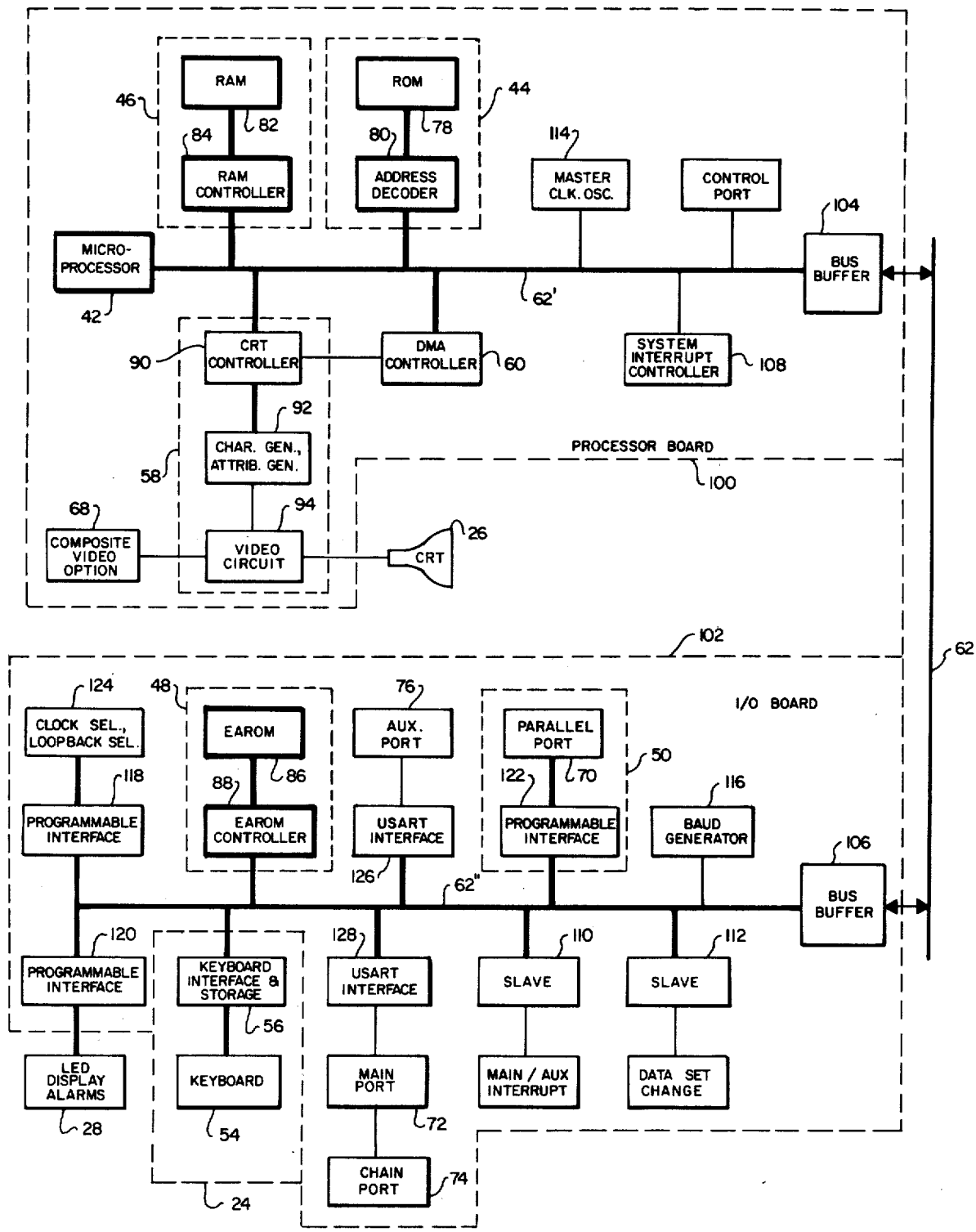
FIG. 4 is a more detailed diagram of the terminal of FIG. 1.

In FIG. 4 there is shown a more detailed block diagram of the preferred embodiment of the terminal 20. As with FIG. 3, FIG. 4 is self-explanatory to those skilled in microprocessor and computer terminal art. The microprocessor 42 is realized using an 8085A 8-bit n-channel microprocessor commercially available from, for example, Intel Corp. (Santa Clara, Calif.). The microprocessor 42 controls the operation of the terminal 22 by executing instructions (op codes) read from the programmed storage section of a ROM 78. The ROM 78 interfaces with the system bus 62' through an address decoder 80. The ROM 78 may be realized by using a wide variety of commercially available ROM or EPROM (electrically programmable read only memory) devices, such as the 2316 or 2716 manufactured by Intel Corp. Preferably, at least 24 Kbytes of ROM are provided. The address decoder 80 may likewise be realized using a ROM or EPROM device, such as a 6331 manufactured by Monolithic Memories, Inc. (Sunnyvale, Calif.), which has been selectively configured or programmed to decode the address bits of the ROM 78.

The preferred embodiment of the terminal 20 accomodates one of four varieties of industry standard 16 pin, as well as one variety of 18 pin, dynamic read/write memories for realization of the system RAM 46. Exemplary memory components such as the 2104A, 2109, 2117, 2118, MK4332D, and MK4164 manufactured by Intel Corp. and Mostek Corp. (Carrollton, Tex.), may be utilized as memory elements of a RAM 82. At least 16 Kbytes of RAM storage is preferrably provided within the RAM 82. Access and control of the RAM 82 is provided by a RAM controller 84. This RAM controller 84 may be realized using a commercially available 3242 memory support device manufactured by Intel Corp. Those skilled in the microprocessor art will be able to implement the 3242, or equivalent RAM controller device 84, with the selected memory elements in order to achieve the desired retrieval or insertion of data into the RAM 82, as well as the retention (refreshing) of data stored therein. Moreover, the literature describing the use of these devices documents how this is done, and such description will not be repeated herein.

The other types of memory elements utilized within the terminal 20 include a non-volatile RAM 46. As shown in FIG. 4, this type of memory may be realized using an electrically alterable read only memory (EAROM) 86 device, such as the commercially available ER2055 manufactured by General Instrument Corp. (Hicksville, N.Y.). The EAROM 86 interfaces with the system bus 62'', and is controlled by an EAROM controller 88. This controller 88 may be realized using a commercially available programmable interface such as the 8255A manufactured by Intel Corp. The literature describing the ER2055 and the 8255A, or equivalent devices, coupled with the knowledge of those skilled in the art, provides the necessary information for utilizing these devices in order to provide the memory functions disclosed herein.

The keyboard 54 may be of conventional design. A commercially available 8041A mask-programmed 8-bit microcomputer may be used as the keyboard and interface storage unit 56; which unit interfaces the keyboard 54 with the system bus 62''. The unit 56 includes ROM and RAM storage, as well as appropriate timers and counters, to allow continual scanning of the keyboard 54 without interrupting the system microprocessor 42. However, as required, the system microprocessor 42 communicates with the keyboard and interface storage unit 56 in order to transfer data from the keyboard 54 to other appropriate areas within the terminal 20. In the preferred embodiment, the keyboard and interface storage unit 56 may be considered as a slave microprocessor to the system microprocessor 42. This is because all communication between the two devices takes place in the form of normal I/O read and write cycles.

Still referring to FIG. 4, it is seen that the terminal 20 includes other elements in addition to the memory elements, keyboard unit 24, and microprocessor 42. In particular, a CRT controller 90, coupled to a character/attribute generator 92, and a video circuit 94 provide the necessary interface between the CRT 26 and the system bus 62' and the DMA controller 60. The CRT controller 90 may be realized using a commercially available 8275 CRT Controller manufactured by Intel Corp. Similarly, the DMA controller 60 may be realized using a commercially available 8237 also manufactured by Intel Corp. Literature available from Intel Corp. teaches how these devices are to be used and interconnected. Any suitable ROM or other device may be used to realize the character/attribute generator 92. In the preferred embodiment, a 2K × 8 ROM, such as the 2316 available from is used for this purpose.

The video circuit 94 includes a crystal oscillator, dot counter, video drive circuits, and other video related circuits required to generate the appropriate signal for driving and controlling the CRT 26 so that desired information is displayed thereon. Those skilled in the appropriate arts are familiar with the details of such conventional circuitry; and accordingly, such circuitry will not be further described herein.

In order to accommodate a remote monitor display, a composite video option 68 is provided in the preferred embodiment of the terminal 20. This option includes the placing of a blank socket on the processor board 100 into which an appropriate composite video generator may be plugged. An exemplary composite video generator is that manufactured by Beehive International, (Salt Lake City, Utah), under Part No. 112-2276.

As FIG. 4 illustrates, the circuitry of the terminal 20 used with the preferred embodiment of the invention may advantageously be arranged on one of two boards. A first board is the processor board 100. A second board is the I/O board 102. Additional boards, such as interconnect board, a power supply board, and etc., may be used as required. Each board shown in FIG. 4 has associated therewith an extension of the system bus 62 to which the various elements of each board may interconnect (the bus 62' being associated with the processor board 100; and the bus 62'' being associated with the I/O board 102). Bus buffers 104 and 106 are used to interface the board buses 62' and 62'' respectively with the system bus 62, and allow the signals to and from the processor board 100 to be appropriately received or sent to the I/O board 102. Such buffers typically include gating means for determining and allowing data flow direction, and may include signal level transformation means as required. The details of the buffer circuits 104 and 106 are not critical to the invention disclosed herein. Thus, any appropriate buffer circuit, or no buffer circuit (if compatible signals are used throughout the terminal, or if only one board is used within the terminal) could be used in the terminal 20.

The system interrupt controller 108 allows priority and other interrupts to selectively interrupt the operation of the microprocessor 42 in order to generate needed time delays, receive external data, or allow other tasks to be performed without tying up the microprocessor 42. Slave interrupt controllers 110 and 112 may be coupled to the master controller 108 in order to expand the number of interrupts that the terminal may handle. A commercially available 8259A Programmable Interrupt Controller manufactured by Intel Corp. may advantageously be used by those skilled in the art to realize both the master and slave interrupt units 108, 110, and 112.

A master clock oscillator 114 is also included on the processor board 100. While the 8085A used to realize the microprocessor 42 has an on-chip oscillator/clock generator, this on-chip capability is not used in the preferred embodiment. Rather, a 6.144 MHz signal is derived from an 18.432 MHz Crystal Oscillator and fed to the 8085A. The 8085A, in turn, divides this signal to a 3.072 MHz signal, which signal then serves as the system clock. The master clock circuitry 114 is also adapted to allow an optional external clock signal to be used in place of the 18.432 MHz signal generated therein.

Included on the I/O board 102 is a baud generator 116. This generator may be realized using a commercially available 8253, manufactured by Intel Corp. A plurality of programmable interfaces 118, 120, and 122 are also employed on the I/O board 102. Each interface allows appropriate signals to be sent to or received from the system bus 62" and corresponding elements to which the programmable interfaces are connected (the clock/loopback select circuitry 124, the LED display and alarms 28, and the parallel port 70). Advantageously, a commercially available 8255A, manufactured by Intel Corp., may be used to realize each of the programmable interfaces 118, 120, and 122. The principle ports for allowing serial external data communications with the terminal 20 include the main port 72, the chain port 74, and the auxiliary port 76. Each of these ports is adapted to receive or transmit serial data either synchronously or asynchronously at rates up to 19.2 Kbaud. This is achieved through the use of universal synchronous/asynchronous receiver/transmitters (USART) 126 and 128, each of which may be realized using a commercially available 8251 Programmable Communications Interface, manufactured by, for example, Intel Corp.

The above discussion describing the elements of the block diagram of FIG. 4 has been deliberately abbreviated in an effort to limit the amount of material that might otherwise be included within this application. The operation and elements of the computer terminal 20 have not been disclosed or taught in detail because: (1) the level of knowledge associated with the theory and operation of computer terminals needed to practice the invention disclosed herein is well known and documented in the art, given the above disclosure, and need not, therefore, be repeated here; and (2) the invention of this application, while by design has been adapted to be used within a computer terminal of the type disclosed, does not relate directly to the data communication functions performed by such a terminal. Rather, the invention of this application relates to a particular method of configuring or formatting a microprocessor-based computer terminal. Accordingly, the disclosure herein includes only that level of detail required to teach those skilled in the art of microprocessor based computer terminals how to practice the invention (even though some tutorial information has been provided for thos unskilled in the art). For those interested, additional information concerning the theory and operation of microprocessor-based computer terminals may be found, for example, in the Intel Peripheral Handbook and Intel Data Catalogs, which references may be procurred from Intel Corp., 3065 Bowers Ave., Santa Clara, CA 95051.

Figure 5:
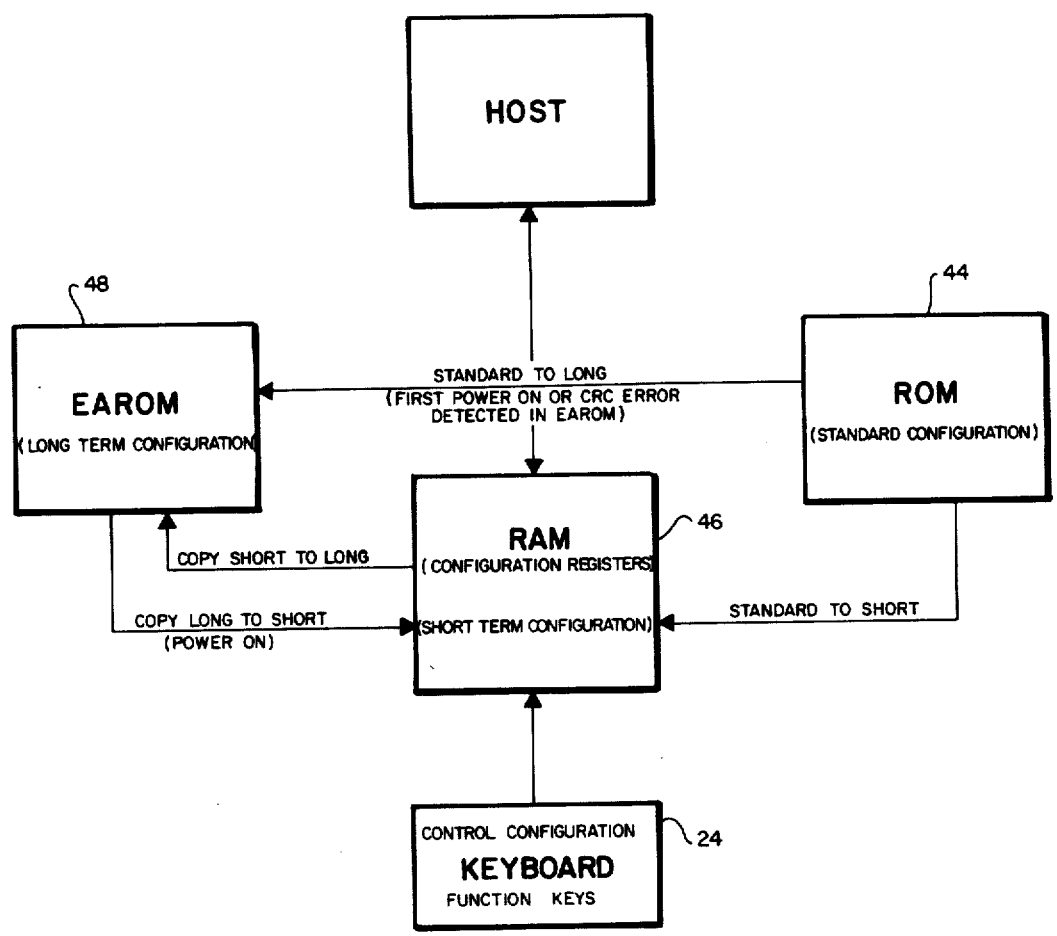
FIG. 5 is a block diagram illustrating the interrelationship of the memory elements of the present invention.
Figure 6:
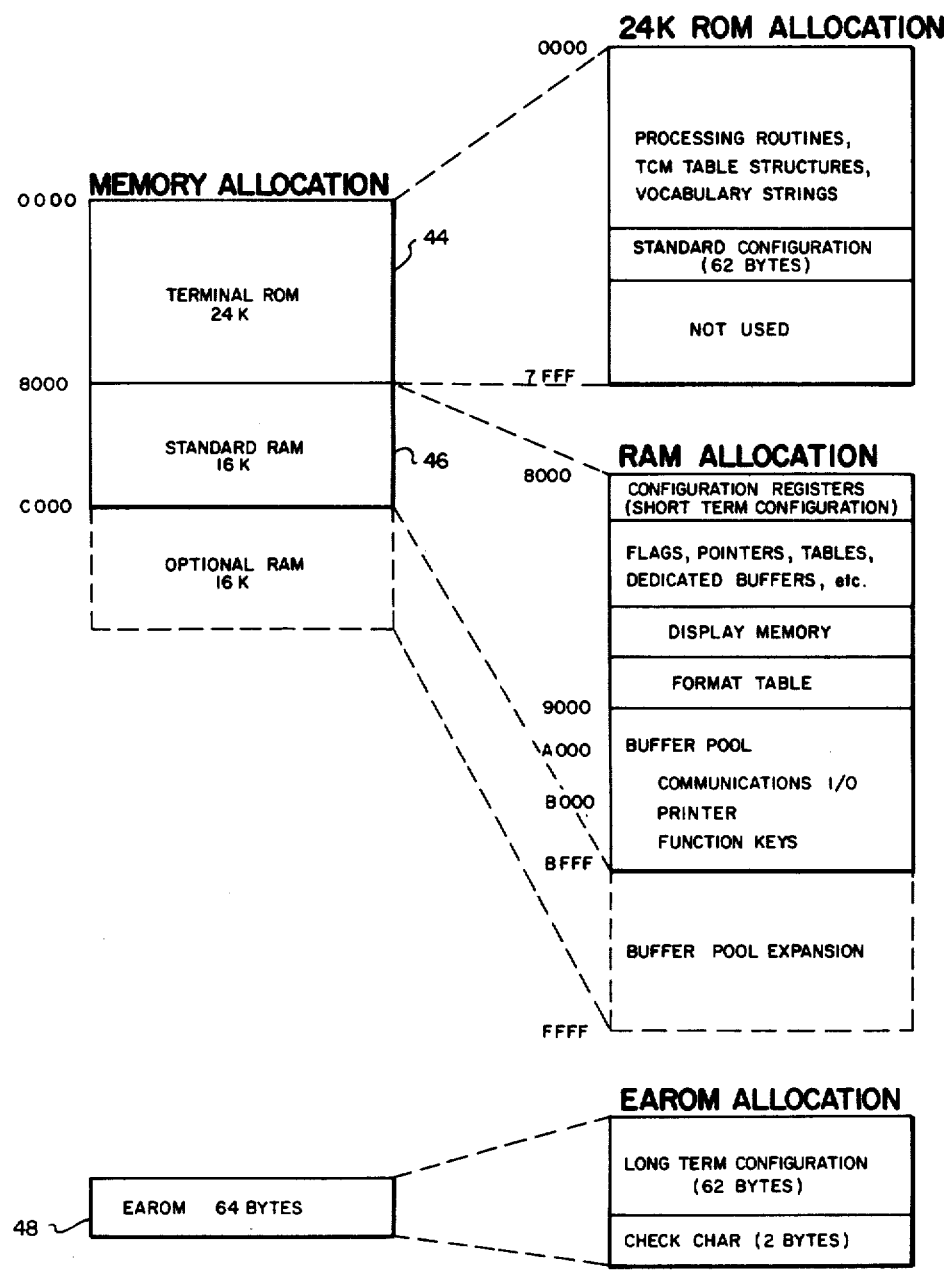
FIG. 6 shows a memory map of the memory elements employed in the preferred embodiment of the invention.

Referring next to FIGS. 5 and 6, there is shown respectively a block diagram depicting the interrelationship of the memory elements employed by the present invention, and a memory map depicting the memory allocation of each memory type. The ROM 44 has 62 bytes thereof dedicated to storage of the standard configuration data. Also, in the ROM 44 are the basic processing routines that enable the terminal 20 to function, including the table structures and vocabulary strings associated with the present invention. The EAROM 48 has 64 bytes of storage, 62 bytes of which are dedicated to holding the long term configuration data, and two bytes of which are used to store cyclic redundancy check (CRC) information. Whenever data is written into the EAROM 48, the CRC bytes are computed and stored in the appropriate locations. Then, whenever data is read out of the EAROM 48, the CRC bytes corresponding to the data thus read are computed and compared to the CRC bytes previously computed and stored in EAROM. If a discrepancy exists between these CRC bytes, then a tentative CRC error condition is declared. In the preferred embodiment, such a tentative, or first, CRC error condition merely causes the read operation to be performed a second time. If, upon this second read operation another CRC error is determined to exist, then a definite CRC error is assumed, and appropriate error messages are displayed and corrective actions taken. Cyclic redundancy checking, or CRC, is an error prevention technique well known, practiced, and understood by those skilled in the art. However, requiring two consecutive CRC errors to exist, one for each of two consecutive read operations, is not known in the art to applicants' knowledge. Advantageously, using a two-pass approach coupled with CRC checking, as applicants have, greatly increases the reliability of a data transfer from the EAROM 48.

Allocated within the RAM 46 are the configuration registers that steer the hardware of the terminal so as to realize a particular configuration. In the preferred embodiment, where there are 62 bytes of standard configuration data, there are at least 62 8-bit bytes (496 bits) of storage capacity within the configuration registers. The configuration data held in these 496 bits of configuration registers is called "short term configuration data" because it is easily lost, or of short term duration, whenever power is removed or interrupted to the terminal. However, as discussed above, the short term configuration data held in the RAM 46 may be copied into the EAROM 48 upon appropriate command. When such a command is given, the processing routine for carrying out this copying process, compares the bits stored in the configuration of RAM (short term) with the corresponding previously stored in the EAROM 48. Only those bits which have changed are written into the EAROM. This is done because the EAROM 48 typically has a limited number of write cycles that may be performed in connection therewith. Thus, by only writing in those bits which have changed, the life of the EAROM 48 is prolonged over what it might otherwise be.

It should be noted that the standard configuration data held in the ROM 44 will be transferred to the EAROM 48 only if one of three conditions exist: (1) an initial power-up cycle is in process; (2) a definite CRC error (based on two consecutive read passes) has been detected while attempting to read from the EAROM; or (3) the operator executes a specific command to copy standard to long (that is, copy the standard configuration data held in ROM to the EAROM). It should also be noted that the standard configuration data held in ROM may, upon execution of a specific command to copy standard to short, be transferred directly into the configuration registers of the RAM 46. Likewise, it is to be noted that the long term configuration data stored in the EAROM 48 may be copied into the configuration registers of the RAM 46. Such a transfer, termed a long to short copy in FIG. 5, occurs automatically as part of a normal power-up sequence. A long term to short term transfer may also be executed by specific command. A short term to long term transfer—that is, a writing of the data bits held in the configuration registers of the RAM 46 into corresponding locations of the EAROM 48 where such bits have changed—may also be executed upon specific command. Such a command is given, for example, after an operator has modified the contents of the configuration registers, using the terminal configuration management system described herein, to fulfill his or her immediate needs. If such modification yields a short term configuration that would be suitable for long term use, the appropriate short term to long term command is given to effectuate the transfer of the modified data into EAROM.

Those skilled in the art will readily be able to create the requisite firmware for carrying out the above described data transfers either upon command or upon the occurrence of the specified conditions (e.g., initial power on, power on, or CRC error).

Figure 7:
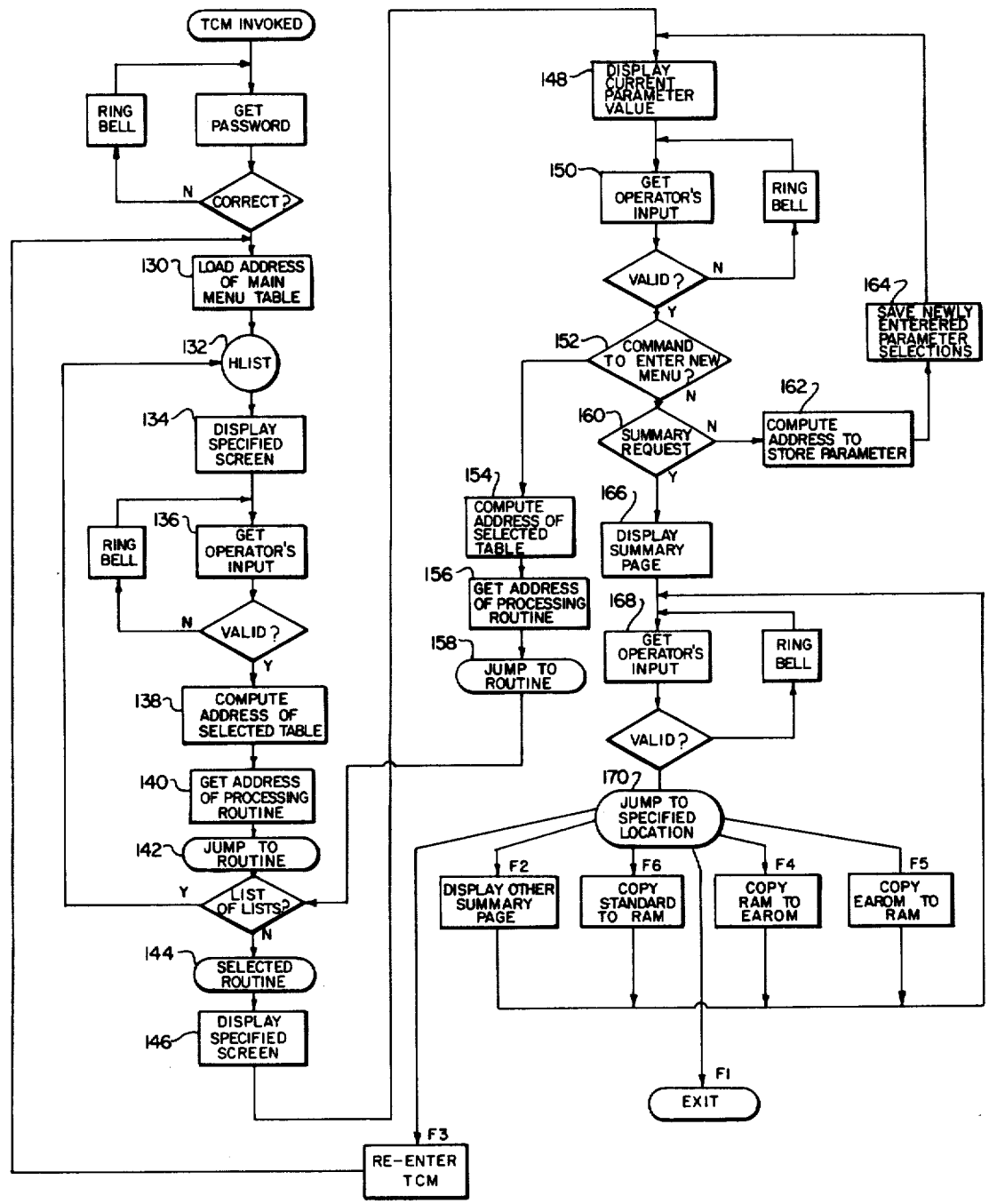
FIG. 7 is a flow chart depicting, in a generalized fashion, the sequence of events that occur whenever the present invention is invoked to manage the configuration of the terminal of FIG. 1.

In FIG. 7, there is shown a generalized flow chart depicting the process used to modify the configuration registers. In this process, the operator keys in, via the keyboard 54, an appropriate control command, typically involving at least two keys, that invokes the terminal configuration manager (TCM) processing routine. As mentioned, the TCM routine is stored in the ROM 44. This TCM routine is password protected, which means that the operator must first key in a proper password before the remainder of the routine becomes accessible. Moreover, the password itself forms part of the defined configuration of the terminal. Thus, the password may be changed to any desired combination of letters, numbers, or symbols. A conventional ASCII code is used for identification of letters, numerals, and symbols. Four 8-bit bytes are dedicated to storage of the password.

After receipt of a correct password, the TCM processing routine receives the address of the main or base menu table. This table contains a list, or menu, of the various configuration parameter groupings from which the operator may choose to modify the configuration parameters associated with the terminal. As such, the main menu table is merely a list of lists, and is designated as "HLIST" at step 132 in FIG. 7.

With the address of the main menu table known, the table is accessed and displayed on the CRT screen 26 as indicated at step 134.

The table shown on the screen 26 of FIG. 1 is exemplary of the main menu table format and the information displayed therein. The lines 133 at the bottom of the screen 26 in FIG. 1 represents specific instructions, and contain messages such as:

USAGE OF KEYS FOR TERMINAL CONFIGURATION
F1-F16—SPECIFY A SELECTION FROM THE DISPLAYED LIST
CONFIG—TERMINATE CONFIGURATION SESSION

Having displayed a menu on the screen, the routine waits for an operator's input as indicated at step 136 of FIG. 7. This input is provided by depressing one of the function keys, F1 through F16, appearing across the top row of the group of keys 40 of the keyboard unit 24 (best shown in FIG. 2). If a key other than a function key is depressed, or some other valid command is not given, an audio alarm sounds to indicate to the operator that a valid input has not been received. If the input is valid, then the address of the next selected table or menu is computed (which address is typically a fixed distance from a known reference address point within the ROM 44), as indicated at step 138 of FIG. 7.

Each menu table has associated therewith its own processing routine. However, because the table structures used are very similar (to be discussed more fully below), and because each table is processed in almost the same manner (as indicated by the generalized flow chart of FIG. 7), relatively few processing routines are required to manage many menu tables. The address of the appropriate processing routine (which routine is also stored in ROM 44) is included as one of the first elements of the stored table. Once this address is known, as occurs at step 140 of FIG. 7, a jump instruction is executed, as shown at step 142, to the desired routine. If the newly accessed routine is for displaying a menu table that is merely another list of a list, as was the main menu table, then, for purposes of the generalized flow chart of FIG. 7, control jumps back to step 132, the specified screen is displayed (step 134), the operator's input is procurred (step 136), and the address of the selected table and corresponding routine are computed or otherwise procured (steps 138 and 140), causing program control to jump to the routine of the newly selected table (step 142). If, on the other hand, the newly accessed routine corresponds to a list of actual parameter values) as opposed to merely a list of a list of parameter groupings), then program control jumps to the selected routine at step 144 and all the possible values that the desired parameter may assume are listed, as indicated at step 146. The current parameter value will also be displayed as indicated at step 148.

Where all possible values of the parameter are listed, the current parameter value is typically indicated by a cursor, such as blocking or underlining (which blocking or underlining may or may not be blinking, depending upon the particular configuration selected). The operator then selects which parameter value is to be assumed, at step 150 of FIG. 7, and if a valid selection is made, waits for the next command at step 152. If this command is to display a new menu table, then the address of the table is compiled at step 154, the address of the corresponding processing routine is procurred at step 156, and program control jumps to the selected routine at step 158. This jump may be either to a table that is a list of a list that begins at step 132 (HLIST), or it may be to a table that is a list of possible parameter values, as at step 144.

If a command to enter a new menu table is not received at step 152, and summary request is not received at step 160, then the address of the configuration parameter that has been modified is computed at step 162 and the contents of the appropriate configuration registers are modified accordingly at step 164. Control is then transferred back to step 148 where the current parameter values are displayed, thereby giving the operator some immediate feedback that the configuration selections have been properly entered into the configuration registers.

If a summary request is made at step 160, then a summary page is displayed at step 166. This is followed by receiving an operator's input at step 168 to indicate the next selection. If a valid selection is made, then a jump instruction is executed at step 170 to the appropriate location. Each selection, save an exit command, is followed by an opportunity to make an additional selection at step 168.

FIG. 11a depicts the menu table that is displayed if F1 is selected from the base menu table (shown on the screen 26 in FIG. 1). FIG. 11b depicts the menu table that is displayed if F1 is again selected from the menu shown in FIG. 11a. Both the menu shown in FIG. 1 (on screen 26) and FIG. 11a are lists of lists, while the menu shown in FIG. 11b is a list of possible parameter values. The menus illustrated in FIGS. 1, 11a, and 11b are only exemplary of the large number of menus that can be displayed.

FIG. 10 illustrates the TCM Menu Tree, that is, exemplary menus that may be displayed in the preferred embodiment. As FIG. 10 shows, there are in this particular embodiment, nine possible menu branches that may be selected from the base, or main, menu. Of these nine possible branches or choices, four (F4, F5, F6, and F9) represent the end of their respective branches. Accordingly, if either of these four selections are made, the menu that will be listed will list possible parameter values that may be selected. The other five choices that may be made from the base menu table (F1, F2, F3, F7, and F8) represent only interim choices, and as such, these branches must be pursued further in order to reach their respective ends where a parameter value may be displayed and modified.

It is to be noted that in the flow chart of FIG. 7, the choice made at step 152 may include movement to the left or the right in the menu tree of FIG. 10. Thus, any branch end (that is, any configuration parameter) can be readily reached (and therefore modified or examined) by merely moving in the appropriate direction among the branches of the menu tree.

It should also be noted, as mentioned earlier, that a summary of all the current values of all the configuration parameters may be displayed as indicated beginning at step 166 of FIG. 7. This summary includes, in the preferred embodiment, a two-page display as exemplified in FIGS. 12a and 12b. The routine required to generate this table may be readily created in firmware by those skilled in the art given the location of the configuration registers, as detailed in FIGS. 13a, 13b, and 13c, and the use of compressed vocabulary strings as discussed below in connection with FIG. 9. It should also be noted that while all the menus accompanying the menu tree of FIG. 10 have not been shown, such menus could readily be devised by those skilled in the art given the information of FIG. 10, and FIGS. 13a, 13b, and 13c.

Figures 8, 9:
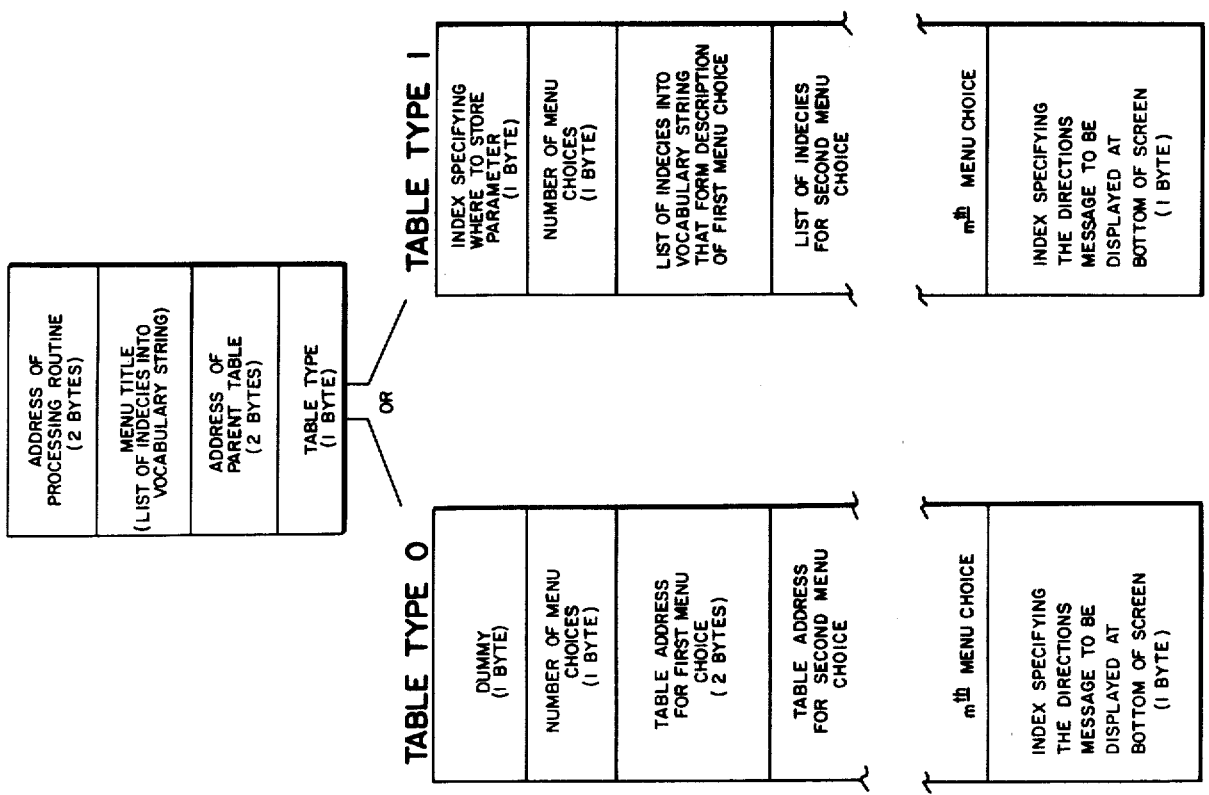
FIG. 8 depicts the generalized table structure utilized by the present invention.
FIG. 9 shows a representation of a portion of a vocabulary string utilized in the preferred embodiment of the invention.

FIG. 8 details the generalized table structure associated with the menu tables of the invention. These table structures are typically stored in ROM. The first two bytes of the table contain the address of the corresponding processing routine, which routine is stored in the ROM 44. Next, the menu title is stored in the table structure. In order to save memory space, a compressed vocabulary string is employed which allows all phrases, and phrase fragments, used as part of the menu table to be referenced as a simple list of indices into the vocabulary string. The use of such vocabulary strings is discussed more fully below in connection with FIG. 9.

After the menu title, the next two bytes of the generalized table structure contain the address of the parent table. The parent table is that table to the left of the table currently being displayed in FIG. 10. Incorporating the address of the parent table into the table structure allows branching back down the menu tree (to the left in FIG. 10) to the base menu, where other parameter groupings may be selected.

Following the address of the parent table, the table includes one byte that indicates the table type. A type 0 table is one that is a list of lists. A type 1 table is one that is a list of possible parameter values. Depending upon the table type, the remainder of the table structure is as shown in FIG. 8. In general, this structure includes for a type 0 table, the number of menu choices, the table address for the first menu choice, the table address for the second menu choice, and so on. Also, an index specifying the directions message to be displayed at the bottom of the screen is provided. For a type 1 table, this information includes an index specifying where the parameter is to be stored, the number of menu choices, a list of indices into the vocabulary string that form the description for the first menu choice, a list of indices for the second menu choice, and so on. An index specifying the directions message to be displayed at the bottom of the screen is also included.

Using table structures that fit the generalized pattern as above described in connection with FIG. 8 allow many menu tables to be managed and displayed by relatively few processing routines. This, of course, advantageously saves ROM space where the processing routines must be stored. Moreover, as FIG. 7 illustrates, many relatively short loops are employed in the processing routines. This allows the logic to be very simple and ROM space is again saved. Further, as FIG. 8 shows, the tables that are processed by the simple routines are also short. This again saves memory space. However, the cost incurred by employing such simple tables is a heavy processing time overhead (that is, it takes a relatively long processing time for all the jumping and searching for vocabulary strings to occur). However, inasmuch as the TCM interfaces with a human operator, the processing that seems long and laborious compared to the system clock, is actually very acceptable, especially in light of the fact that the TCM processing routines are typically not frequently invoked compared to other terminal routines.

As mentioned, the TCM employs compressed vocabulary strings to define phrases and phrase fragments (e.g., words) only once even though these phrases and fragments are used in many different places by many different menu tables. This, of course, saves ROM space. Moreover, for most uses, a single byte index is used to address the strings in lieu of a 2 byte address. This is made possible because all the vocabulary strings are referenced from a known ROM address. The location of a desired string may therefore be indexed as a simple count from the known address.

FIG. 9 shows exemplary vocabulary strings that may be utilized by the present invention. Vocabulary strings are used for menu titles, menu options, and menu directions. Each byte in the string defines one ASCII character to be displayed. The character is specified by the seven least significant bits of the byte. The most significant bit of the byte is used to define the last character in each phrase or phrase fragment. Thus, the most significant bit defines boundaries between phrases or phrase fragments, and the index into the vocabulary string need only indicate a starting point, not a stopping point.

When displaying a desired string as part of a menu table, the logic searches down the vocabulary string, counting phrase fragments until the specified entry (index) is found. Then the entire string, up to and including the boundary point, is copied to the screen by appropriate processing routines.

While the invention disclosed herein has been described by means of specific examples and in specific embodiments, we do not wish to be limited to such examples and embodiments, for obvious modifications will occur to those skilled in the art without departing from the spirit and scope of the invention.

What is claimed is:

1. A terminal configuration manager for use in a microprocessor based computer terminal, said terminal including a microprocessor, a display screen, a keyboard, memory, and appropriate hardware and firmware for allowing said microprocessor to interact with said display screen and keyboard, said terminal configuration manager comprising:

a plurality of configuration registers, selected bits of each of which are adapted to store configuration data that defines a particular configuration parameter within said terminal;

non-volatile read only storage means for storing a set of standard configuration data;

non-volatile read/write storage means for storing a set of long term configuration data;

first transfer means for transferring said set of standard configuration data from said non-volatile read only storage means to said non-volatile read/write storage means, whereby said long term configuration data becomes the same as said standard configuration data;

second transfer means for transferring said long term configuration data from said non-volatile read/write storage means to said configuration registers;

verification means for verifying the data transfer performed by said second transfer means and for declaring an error condition whenever said data transfer cannot be verified;

configuration management means for selectively modifying the configuration data stored in said configuration registers;

means for displaying on said display screen a table that summarizes said configuration parameters defined by the configuration data stored in said configuration registers; and third transfer means for transferring said configuration data from said configuration register to said non-volatile read/write storage means after said data has been modified by said configuration management means, whereby said long term configuration data becomes the same as said modified configuration data.

2. A terminal configuration manager as defined in claim 1 wherein said configuration management means comprises:

a plurality of processing routines stored in said non-volatile read only storage means for use by said microprocessor, each of said processing routines being adapted to cause said microprocessor to display a menu list on said display screen and appropriately respond to a manual selection of the possible choices listed on said menu list;

means for invoking a first of said processing routines in response to a specific command made to said terminal through said keyboard; and a common table structure for all of said menu lists that may be displayed by said plurality of processing routines, said common table structure being adapted to make efficient use of memory space within said terminal.

3. A terminal configuration manager as defined in claim 2 further including a group of specially labeled keys added to the keyboard of said terminal, said group of keys serving as the means for making the manual selection of the possible choices listed on said menu lists.

4. A terminal configuration manager as defined in claim 3 wherein said group of keys are labeled $f_1, f_2, f_3, \ldots f_n$, where n is the integer number of such keys in said group, and further wherein the choices listed on said menu lists are each labeled $f_1, f_2, f_3 \ldots f_m$, where m is the integer number of such choices listed on said menu lists and m is less than or equal to n.

5. A terminal configuration manager as defined in claim 2 wherein the appropriate responses to said manual selection of the possible choices listed on said menu list include:

modifying a configuration parameter value, by changing the appropriate bits of its corresponding configuration register, as dictated by the selection made if the selection made is to modify such parameters; and searching out the processing routine corresponding to the selection made if the selection made is to view another menu list.

6. A terminal configuration manager as defined in claim 5 wherein said first of said processing routines causes a base menu list to be displayed on said display screen that includes a list of configuration parameter groupings, each of said groupings having a label associated therewith to facilitate the manual selection thereof.

7. A terminal configuration manager as defined in claim 6 wherein said common table structure invokes vocabulary strings in order to create the textual messages and labels associated with each menu list, and vocabulary strings comprising a list of phrases and phrase fragments that are stored in known locations of said non-volatile read only memory means.

8. A terminal configuration manager as defined in claim 7 wherein each of said vocabulary strings comprises a list of bytes of data, each byte corresponding to a character to be displayed, all but the most significant bit of each byte defining a known code of the character to be displayed, the most significant bit of each byte defining whether the character is the last character of the string.

9. A terminal configuration manager as defined in claim 8 wherein said common table structure includes, for each menu list, a plurality of data bytes stored sequencially beginning at a known location in the memory of said terminal, said data bytes including in sequence:
- an address of the particular processing routine requested to display the desired menu list;
- a plurality of indices specifying the location of the vocabulary strings required to display the title of said menu list;
- an address of a parent table, if any, associated with the menu list to be displayed;
- an indication of the type of menu list to be displayed, a type 0 list being one that is a list of lists, and a type 1 list being one that is a list of possible configuration parameters;
- an index specifying the location where a configuration parameter value is to be stored if the menu list to be displayed is a type 1 list, and a dummy data byte if the menu list to be displayed is a type 0 list;
- an indication of the number of choices m available in the menu list to be displayed;
- a list of indices into the vocabulary strings, said vocabulary strings forming the description of the $i^{th}$ menu choice, and, if a type 0 list is to be displayed, an address of the menu list associated with the $i^{th}$ menu choice, said list of indices being repeated for each $i^{th}$ menu choice, i=1, 2, ... m; and
- a group of indices into the vocabulary strings, said vocabulary strings specifying instructions and messages to be displayed as part of the menu list.

10. A terminal configuration manager as defined in claim 2 wherein said verification means comprises a two pass cyclic redundancy check, or two pass CRC, wherein write CRC bytes are computed and stored in said non-volatile read/write memory means as data is written into said non-volatile read/write memory means by either said first or third transfer means, and wherein first read CRC bytes are computed as data is read out of said non-volatile read/write memory means by said second transfer means, said first read CRC bytes being compared with said write CRC bytes, said data being read out of said non-volatile read/write memory a second time, and corresponding second read CRC bytes being computed, only if said comparison between said first read CRC bytes and said write CRC bytes indicate a difference exists therebetween, a definite CRC error being assumd by said verification means only if said second read CRC bytes differ from said write CRC bytes.

11. A terminal configuration manager as defined in claim 10 including means for activating said first transfer means by the application of power to the terminal for the first time.

12. A terminal configuration manager as defined in claim 11 including means for activating said first transfer means by the occurrence of said definite CRC error.

13. A terminal configuration manager as defined in claim 12 including means for activating said first transfer means by direct manual command received via the keyboard of the terminal.

14. A terminal configuration manager as defined in claim 2 wherein said non-volatile read only memory means comprises a combination of ROM devices that provide at least 24 Kbytes of memory, and an address decoder for facilitating the reading of data held in known addresses of said ROM devices under control of the microprocessor.

15. A terminal configuration manager as defined in claim 2 wherein said non-volatile read/write memory means comprises an electrically alterable read only memory, or EAROM, device, and a suitable EAROM controller for facilitating the reading and altering of particular data held in known addresses of said EAROM under control of the microprocessor.

16. A terminal configuration manager as defined in claim 15 said third transfer means includes means for comparing the data to be transferred into said EAROM device with the data already stored therein, and to alter the data stored in the EAROM device only at those locations where the comparison indicates the data is to change from the data already stored therein.

17. A terminal configuration manager as defined in claim 16 wherein said configuration registers comprise a portion of a random access memory, or ROM.

18. A method for configuring a microprocessor-based computer terminal having a microprocessor, a display screen, a keyboard, a ROM, and a RAM, said RAM including a group of configuration registers, the contents of said configuration registers being adapted to define a short term configuration of said terminal, said method comprising the steps of:
- (a) placing a set of standard configuration data in said ROM beginning a known location;
- (b) including within said terminal a non-volatile read/write memory having the capacity for holding a set of long term configuration data, said set of long term configuration data being of equal size as said set of standard configuration data;
- (c) copying said set of standard configuration data into said non-volatile read/write memory when power is first applied to said terminal, thereby causing the long term configuration data to initially assume the values of said standard configuration data;
- (d) copying the long term configuration data held in said non-volatile read/write memory to the configuration registers of said RAM as part of the normal power-up cycle of said terminal, thereby causing the short term configuration data of said terminal to assume the values of said long term configuration data each time power is applied to the terminal;
- (e) selectively invoking configuration management means within said terminal for allowing the short term configuration data held in the configuration registers to be selectively displayed on the display screen and easily modified and summarized as desired via manual commands and selections entered into the terminal through said keyboard; and
- (f) selectively copying the short term configuration data, as modified by said configuration management means, from the configuration registers to the non-volatile read/write memory, thereby causing the long term configuration data to assume the value of the modified short term configuration data.

19. A method for configuration a microprocessor-based computer terminal as defined in claim 18 further including the steps of:
- (g) selectively copying the standard configuration data stored in said ROM directly to the configuration register of the RAM, thereby allowing the short term configuration of said terminal to directly assume a standard configuration at times other than when power is initially applied to the terminal; and (h) selectively copying the long term configuration data held in the non-volatile read/write memory to the configuration registers of said RAM, thereby allowing the short term configuration of said terminal to directly assume a long term configuration at times other than when power is applied to the terminal.

20. A terminal configuration method as defined in claim 19 wherein the configuration management means of step (e) is adapted to perform the following steps as the short term configuration data is modified and summarized;

(1) displaying a first menu list on the display screen in response to having said configuration management means invoked, said first means list including a list of configuration parameter groupings from which an operator may select a particular grouping of interest, each of said groupings being identified with an appropriate label;

(2) receiving an operator response via the keyboard to indicate which parameter grouping has been selected;

(3) responding to the selection of step (2) by displaying a second menu list that further details the selection of the parameter grouping of interest, said second menu list including a list of possible selections, each identified with the same type of label as used in the first menu list, that the operator may make to further narrow the parameter grouping or to define a configuration parameter;

(4) receiving an operator response via the keyboard to indicate an appropriate selection corresponding to the second menu list; and (5) responding to the selection of step (4) by
 (i) displaying a menu list in accordance with the selection made if the selection is to display such a list,
 (ii) modifying the short term configuration data corresponding to a configuration parameter of interest if the selection is to modify said parameter,
 (iii) displaying a summary of all the configuration parameters if the selection is to summarize the short term configuration data,
 (iv) returning to step (1) above if the decision is to reinvoke the configuration management means, and
 (v) terminating the operation of the configuration management means if the selection is to jump to steps (f), (g), or (h).

21. A terminal configuration method as defined in claim 20 including the step of including in the menu lists displayed as part of step (e) textual messages comprised of phrases and phrase fragments that give instructions and directions to the operator relative to the selections that can be made, thereby enabling the operator to make such selections without reference to external documentation.

22. A terminal configuration method as defined in claim 21 including the step of storing the textural messages included in the displayed menu lists in the ROM of the terminal in vocabulary strings, each vocabulary string comprising a list of character codes, each code identifying a character of a phrase or phrase fragment, the first character of each phrase or phrase fragment having an index associated therewith, and the last character of each phrase or phrase fragment having a phrase terminating code assigned thereto, whereby phrases and phrase fragments are defined in ROM memory only once even though used many times in the various menu lists displayed as part of step (e), a desired phrase or phrase fragment being readily located in ROM through the single index, that identifies where said phrase or phrase fragment begins.

23. A terminal configuration method as defined in claim 22 including the step of adding to the keyboard of the terminal a special group of keys added, each of said special group of keys having a label affixed thereto that corresponds to the labels used in said menu lists, and further wherein the operator selections made as part of step (e) are made by depressing the key of the special group of keys having the label that corresponds to identifying label associated with the desired choice displayed on the menu list.

24. A terminal configuration method as defined in claim 22 including the step of accompanying the transfers of configuration data to said non-volatile read/write memory as occur in steps (c) and (f), by the generation of write cyclic redundancy check, or write CRC data, said write CRC data being stored in known locations of said non-volatile memory.

25. A terminal configuration method as defined in claim 24 including the step of accompanying the transfers of configuration data from said non-volatile read/write memory, as occur in steps (d) and (h), by the generation of read CRC data, which read CRC data is compared with said write CRC data as part of said data transfer from the non-volatile read/write memory, and further wherein a difference between said read and write CRC data causes said configuration data to be transferred from said non-volatile read/write memory a second time, there being read CRC data generated a second time as part of said second transfer, a difference between said write CRC data and said second read CRC data causing a CRC error condition to be declared.

26. A terminal configuration method as defined in claim 25 including the step of automatically copying said set of standard configuration data into said non-volatile red/write memory upon the occurrence of said CRC error condition.

27. A terminal configuration method as defined in claim 22 including the step of using as the non-volatile read/write memory included within the terminal in step (b) an electrically alterable read only memory, or EAROM.

28. A terminal configuration method as defined in claim 27 wherein the copying of configuration data from the configuration registers of the RAM into said EAROM, as occurs in step (f), includes:

(1) comparing each data bit of the short term configuration data held in the configuration registers with the corresponding data bits of the long term configuration data held in the EAROM; and (2) copying data into only those bits of the EAROM where the comparison of step (1) immediately above reveals that a different data bit is to be stored therein from that data but previously stored therein.

* * * * *